(12) United States Patent
Nicot et al.

(10) Patent No.: US 6,227,060 B1
(45) Date of Patent: May 8, 2001

(54) DEVICE FOR MEASURING TORQUE IN A ROTATING SHAFT

(75) Inventors: Christophe Nicot, Epagny; Alain Bochet, Seynod, both of (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/052,285

(22) Filed: Mar. 31, 1998

(30) Foreign Application Priority Data

Mar. 28, 1997 (FR) .................................................. 97 03828

(51) Int. Cl.$^7$ ........................................................ G01L 3/00
(52) U.S. Cl. ........................................ 73/862.08; 180/144
(58) Field of Search ........................... 73/862.33, 862.08; 180/443, 444

(56) References Cited

U.S. PATENT DOCUMENTS 5,355,315  10/1994  Daido et al. .
5,501,110 * 3/1996 Peilloud et al. ................. 73/862.321
5,699,874 * 12/1997 Miyaura ............................... 180/443
5,732,790 * 3/1998 Endo et al. ........................... 180/444

* cited by examiner

Primary Examiner—Benjamin R. Fuller
Assistant Examiner—Jewel V. Thompson
(74) Attorney, Agent, or Firm—John C. Bigler

(57) ABSTRACT

A device for measuring torque in a rotating shaft of a vehicle steering column including a magnetic-field generator situated in a plane of cross section of the rotating shaft and a detector which delivers a signal proportional to the torque in the rotating shaft as a result of the relative angular offset between the field generator and the detector. A first electronic circuit inside the steering column is fixed to a support that concentrates the magnetic field and moves past the magnetic field generator together with a mechanical connection for angular return of two sections of the rotating shaft. Measurement sensors carried by the first electronic circuit deliver signals to a second electronic circuit outside the steering column, for processing those signals and for operating receiver devices.

5 Claims, 2 Drawing Sheets

DEVICE FOR MEASURING TORQUE IN A ROTATING SHAFT

The invention relates generally to a torque measurement device to be mounted on a rotating shaft used in power-assisted steering. More particularly, the invention relates to a device for measuring torque in a rotating shaft, of the type having a magnetic-field generator situated in the plane of a cross section of the shaft and a detector which delivers a signal proportional to the torque in the shaft as a result of the relative angular offset between the field generator and the detector.

The French publication "Le journal de l'Automobile" No. 510 of Dec. 1, 1995 describes a steering column for a power-assisted steering system. This column is equipped with a torque sensor device which delivers a signal proportional to the torque, fixed to an input shaft operated by the steering wheel and connected to a torsion bar. The column is also equipped with a worm carried by an output shaft operated by an electric motor driven as a function of the electrical signal delivered by the torque sensor. Additional torque-limiting means is formed between the input shaft and the output shaft, given the small cross section of the torsion bar. The torque sensor and the worm are housed in an arrangement protruding from the steering column tube. Angular displacement between the input and output shafts is converted into an axial movement of the input shaft bearing, and the displacement of this shaft is converted into a rotary movement with an electrical signal that represents the steering command torque being delivered.

The French patent publication FR-A-2692986 describes a mechanical device for measuring torque integrated into a steering column, the principle of operation of which relies on measuring microdisplacements under torsional loading, of two sections of a very rigid shaft. The entire device is located within the steering column and is associated with electronic processing circuits and with a coiled power cable which is also the output cable for the signal to the calculation unit of the power-assisted steering device. However, this compact arrangement, which allows the circuit to be produced in a number of ways, does not allow the radial size to be limited to the outside dimensions of the column tube.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a device for measuring torque in a rotating shaft of a vehicle steering column. A magnetic field generator is situated in a plane of a cross section of the rotating shaft, and a first electronic circuit is fixed inside the steering column to a support that concentrates the magnetic field of the magnetic field generator and moves past the magnetic field generator together with a mechanical means for angular return of two sections of the rotating shaft. Measurement sensors are carried on the first electronic circuit and deliver a signal proportional to the torque in the rotating shaft as a result of the relative angular offset between the magnetic field generator and the measurement sensors. A second electronic circuit for processing signals from the measurement sensors is to be located outside the steering column.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
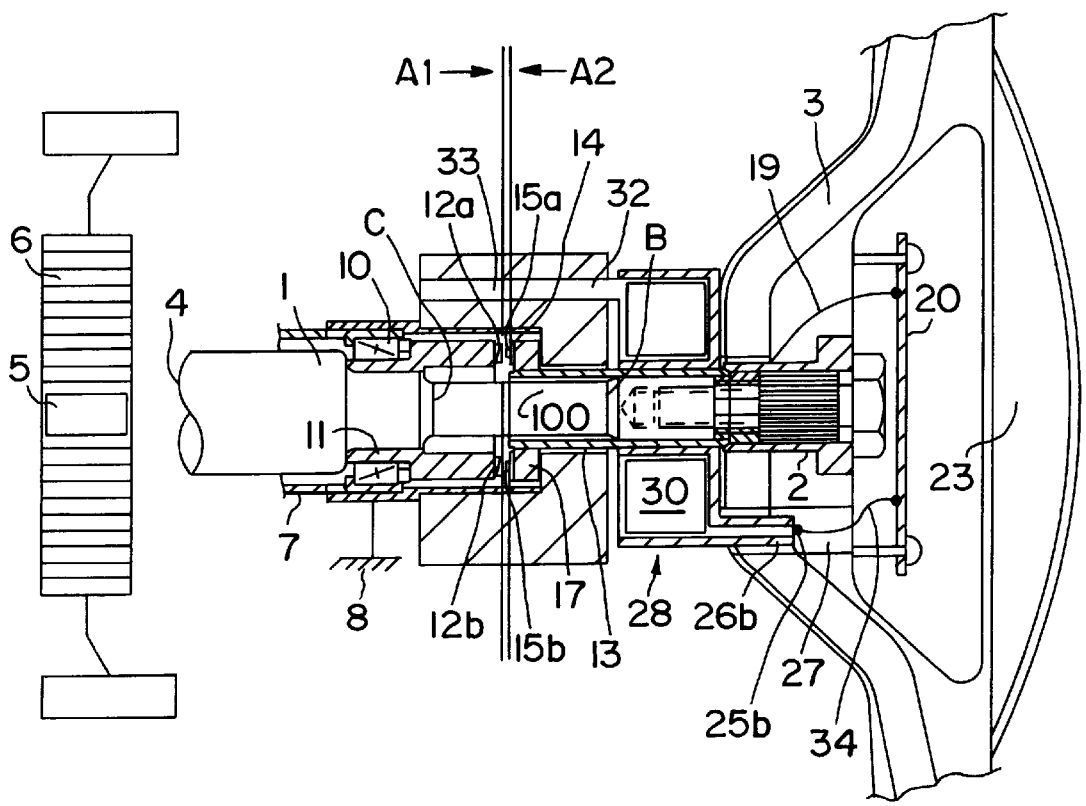
FIG. 1 is a view in longitudinal section illustrating the way in which the device of the present invention may be mounted on a rotating shaft.

With reference to FIG. 1, a rotating steering column shaft 1 is intended to be connected by its end 2 to a steering wheel 3 and by its end 4 to a receiving pinion 5 intended to control a steering rack 6. The shaft 1 is surrounded by the tubular cylinder 7 of a steering column mounted in a support shown schematically with the reference 8.

On its inside, the steering column has a bearing 10 of a rotating hub 11 which supports a magnetic-field generator 12. The hub 11 and the generator 12 are made of a ferromagnetic material and are situated in the plane of a cross section Al of the shaft 1. The generator 12 consists, as is known, of two diametrically opposed elements 12a, 12b arranged symmetrically in the plane of the cross section Al of the shaft 1. Integrated into the shaft 1 is the portion 100 of a torsion bar, two sections B and C of which are respectively secured to a mechanical angular return means consisting of a sleeve 13 for connecting to the shaft 1 and to the hub 11. The hub 11 and the sleeve 13 extend in the direction of the plane of the section Al.

Figure 2:
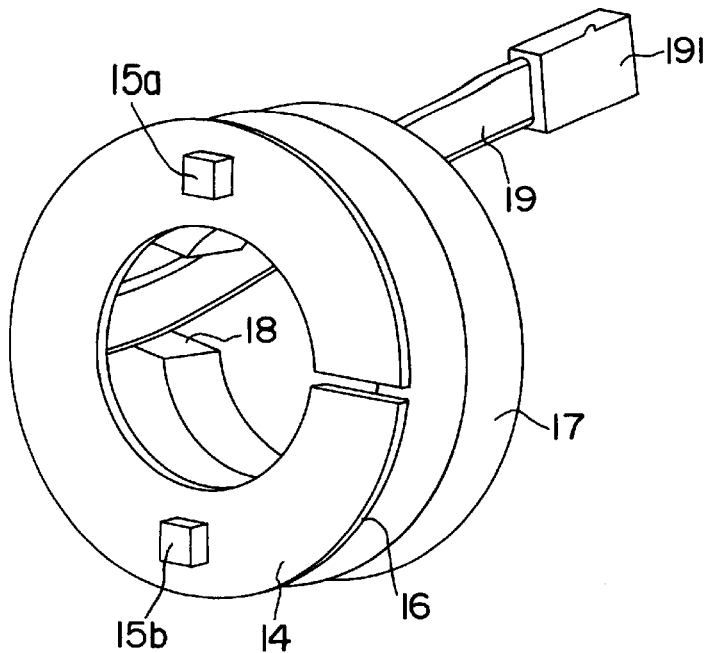
FIG. 2 is a perspective view illustrating the magnetic-field detection device of FIG. 1.

The sensitivity of the torque sensor is directly proportional to the length of the torsion bar and therefore to the distance between sections B and C. Fixed to the free end of the sleeve 13 is a first electronic detection circuit 14 inside the steering column and which consists, particularly, of Hall-effect sensors 15a and 15b situated in the plane of a cross section A2 of the shaft 1 and, as shown in FIG. 2, mounted on a printed circuit 16 itself fixed to a magnetic field concentrating support 17 rigidly attached to the sleeve 13. The first electronic circuit 14 carries a series of amplifying and/or filtering components of the amplifying and torque-measuring device, as well as the electronic components specific to each receiver actuated.

Figure 3:
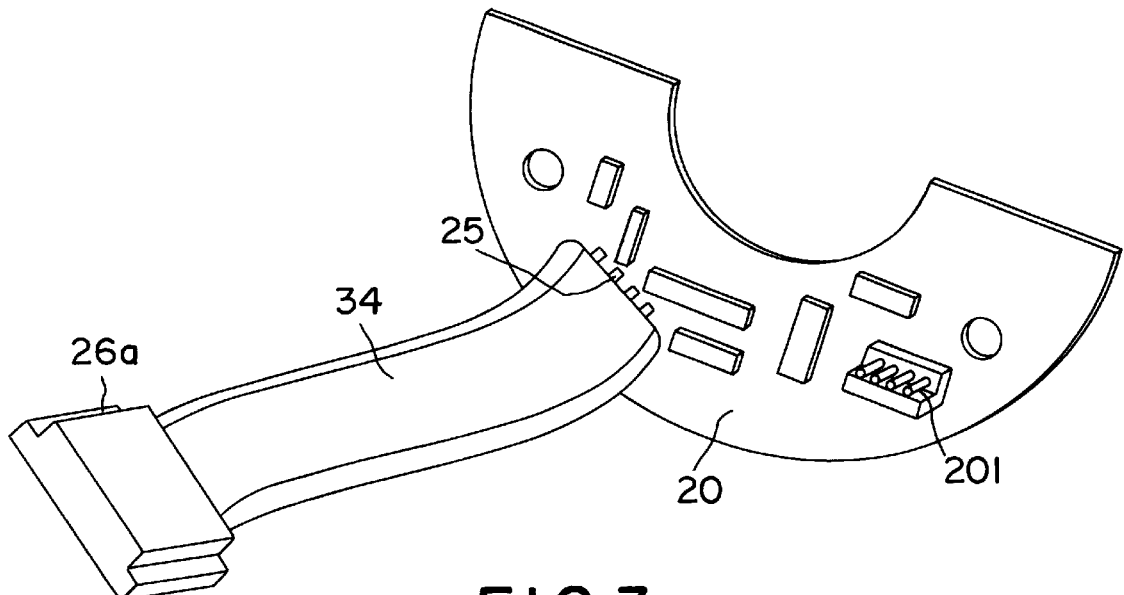
FIG. 3 is a perspective view illustrating the circuit of the device of FIG. 1, positioned outside the steering column.

The support 17 has an axial groove 18 for the passage of a ribbon cable 19 which, via a connection element 191, provides a connection between the first electronic circuit 14 and the connector element 201 of a second, mobile, processing circuit 20, as shown by FIG. 3, outside the steering column and mounted in the steering wheel 3. The mobile processing circuit 20 is mounted in a cavity 21 of the steering wheel 3 and anchored to the bottom of the cavity 21. The cavity 21 is closed by a functional cover 22 screwed to the body of the steering wheel 3.

By way of example, the cover 22 may contain a receiver such as an inflatable bag represented diagrammatically under reference 23 for restraining the driver of the vehicle. The external circuit 20 also has a collection of connection pins 25 to which the cable 34, one end of which has a connector 26a for plugging into a joining connector 26b is attached. The cable 34 follows a passage 27 made in the steering wheel 3 to be connected to the coiled cable for controlling the inflatable bag 23. The joining connector 26 constitutes the input element for a transfer unit 28 in which is coiled a ribbon cable represented diagrammatically by the reference 30 mounted in a cartridge the stationary output pin 32 of which allows a connector 33 for powering and actuating the torque measurement device to be plugged in.

The torque measurement device of the present invention overcomes the prior art problem of size by incorporating individual electronic modules. Some of the modules, known as the regulating modules, are mounted removably and are incorporated into the steering wheel. The invention provides a simplified connection means for joining the modules of the measurement device together. The device thus produced can be mounted in the steering wheel and connected, for example, to a coiled cable used in a conventional way for triggering an inflatable bag for restraining a passenger of the vehicle.

The large cross section torsion shaft, whose use is possible because of the high sensitivity of the measurement device used, is capable of withstanding all of the command torque and avoids having to use additional limiting means such as mechanical stops. As a result of the simplicity of the design, and the modular nature proposed, the overall size of the steering column can be small and is not altered by the torque measurement device. Other features and advantages of the invention will become clear from reading the description of one embodiment of the device, given with reference to the appended drawings in which:

Having described the invention, what is claimed is:

1. A device for measuring torque in a rotating shaft of a vehicle steering column, the device comprising:

a magnetic field generator situated in a plane of a cross section of the rotating shaft;

a first electronic circuit inside the steering column, fixed to a support that concentrates the magnetic field of the magnetic field generator and moves past the magnetic field generator together with a mechanical means for angular return of two sections of the rotating shaft;

measurement sensors carried on the first electronic circuit and which deliver a signal proportional to the torque in the rotating shaft as a result of the relative angular offset between the magnetic field generator and the measurement sensors; and a second electronic circuit for processing signals from the measurement sensors, the second electronic circuit to be located outside the steering column.

2. A device for measuring torque in a rotating shaft of a vehicle steering column, the device comprising:

a magnetic field generator situated in a plane of a cross section of the rotating shaft;

a first electronic circuit inside the steering column, fixed to a support that concentrates the magnetic field of the magnetic field generator and moves past the magnetic field generator together with a mechanical means for angular return of two sections of the rotating shaft, the mechanical angular-return means consisting of a tubular support secured to a torsion shaft which extends toward an end of the torsion shafts;

measurement sensors carried on the first electronic circuit and which deliver a signal proportional to the torque in the rotating shaft as a result of the relative angular offset between the magnetic field generator and the measurement sensors; and a second electronic circuit for processing signals from the measurement sensors, the second electronic circuit to be located outside the steering column;

wherein the tubular support carries the support that concentrates the magnetic field, to which support the first electronic circuit is fixed, from which electronic circuit a power and connection cable extends toward the second electronic circuit, the second electronic circuit to be incorporated into a steering wheel of the vehicle.

3. The device as claimed in claim 1, wherein the first electronic circuit carries components of a measurement and amplification device and components which are specific to receiver devices.

4. The device as claimed in claim 2, wherein the second electronic circuit is adapted to be mounted in a cavity of the steering wheel, the cavity being closed by a functional cover and the second electronic circuit being anchored to a bottom surface of the cavity.

5. A device for measuring torque in a rotating shaft of a vehicle steering column, the device comprising:

a magnetic field generator situated in a plane of a cross section of the rotating shaft;

a first electronic circuit inside the steering column, fixed to a support that concentrates the magnetic field of the magnetic field generator and moves past the magnetic field generator together with a mechanical means for angular return of two sections of the rotating shaft;

measurement sensors carried on the first electronic circuit and which deliver a signal proportional to the torque in the rotating shaft as a result of the relative angular offset between the magnetic field generator and the measurement sensors;

a second electronic circuit for processing signals from the measurement sensors, the second electronic circuit to be located outside the steering column; and a first connector for coupling the second electronic circuit with an inflatable bag and a second connector fixed to a steering wheel of the vehicle, the first and second connectors to be connected together for powering a unit connected to the torque measurement device.

* * * * *